Figure 1:
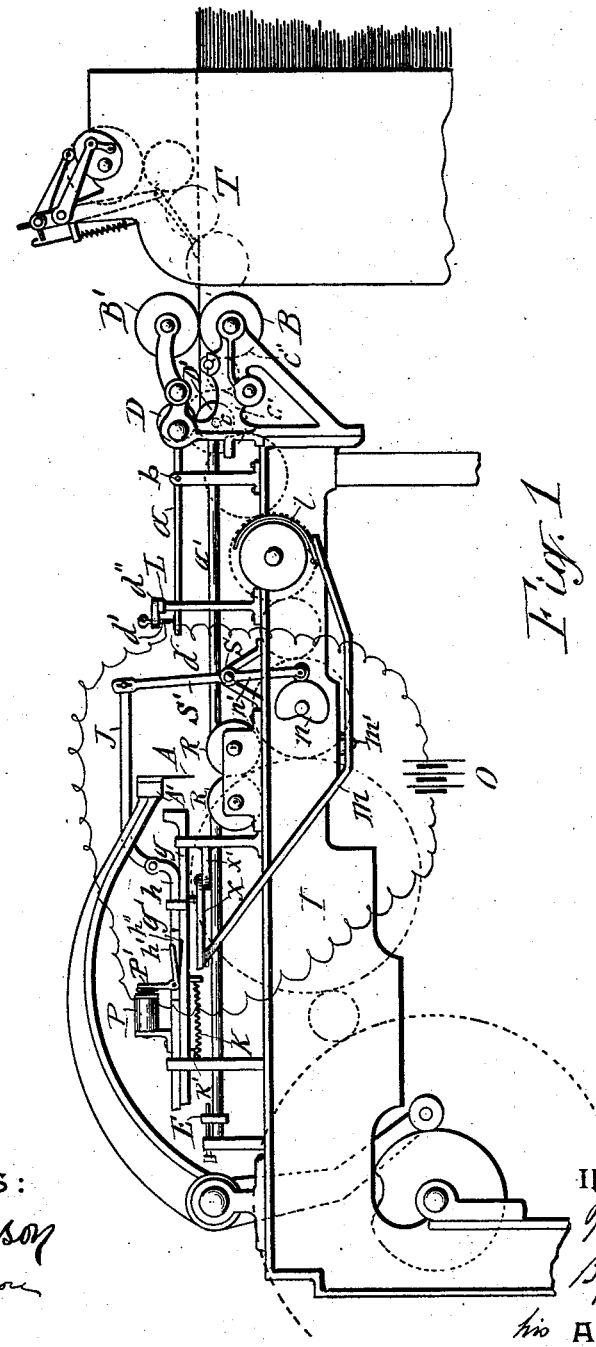

(No Model.) 8 Sheets—Sheet 1.

T. C. DEXTER.
AUTOMATIC STOP MOTION DEVICE.

No. 567,302. Patented Sept. 8, 1896.

WITNESSES:
R. E. Tomlinson
C. L. Bendixon

INVENTOR
Talbot C. Dexter
By E. Laass
his ATTORNEY (No Model.) 8 Sheets—Sheet 2.

T. C. DEXTER.
AUTOMATIC STOP MOTION DEVICE.

No. 567,302. Patented Sept. 8, 1896.

WITNESSES:
INVENTOR:
Talbot C. Dexter
By E. Laass
his ATTORNEY (No Model.) 8 Sheets—Sheet 3.
T. C. DEXTER.
AUTOMATIC STOP MOTION DEVICE.
No. 567,302. Patented Sept. 8, 1896.
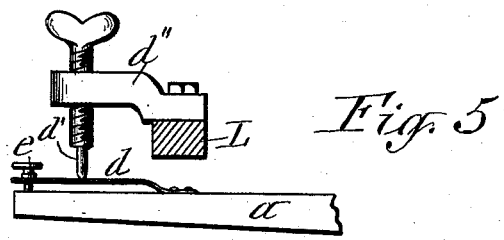
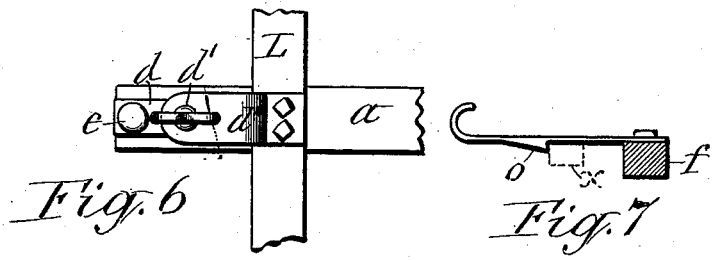
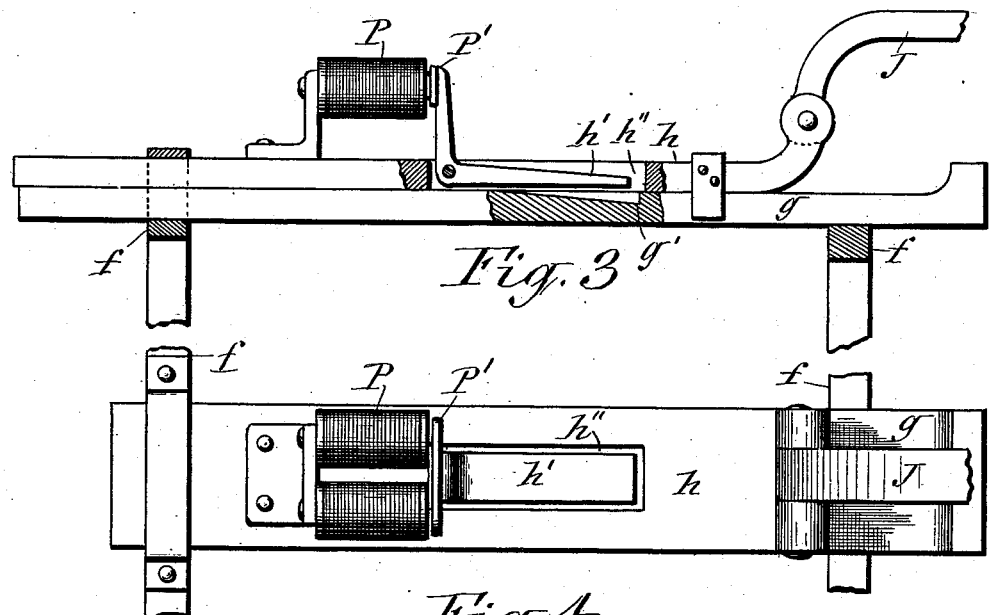
WITNESSES: INVENTOR:

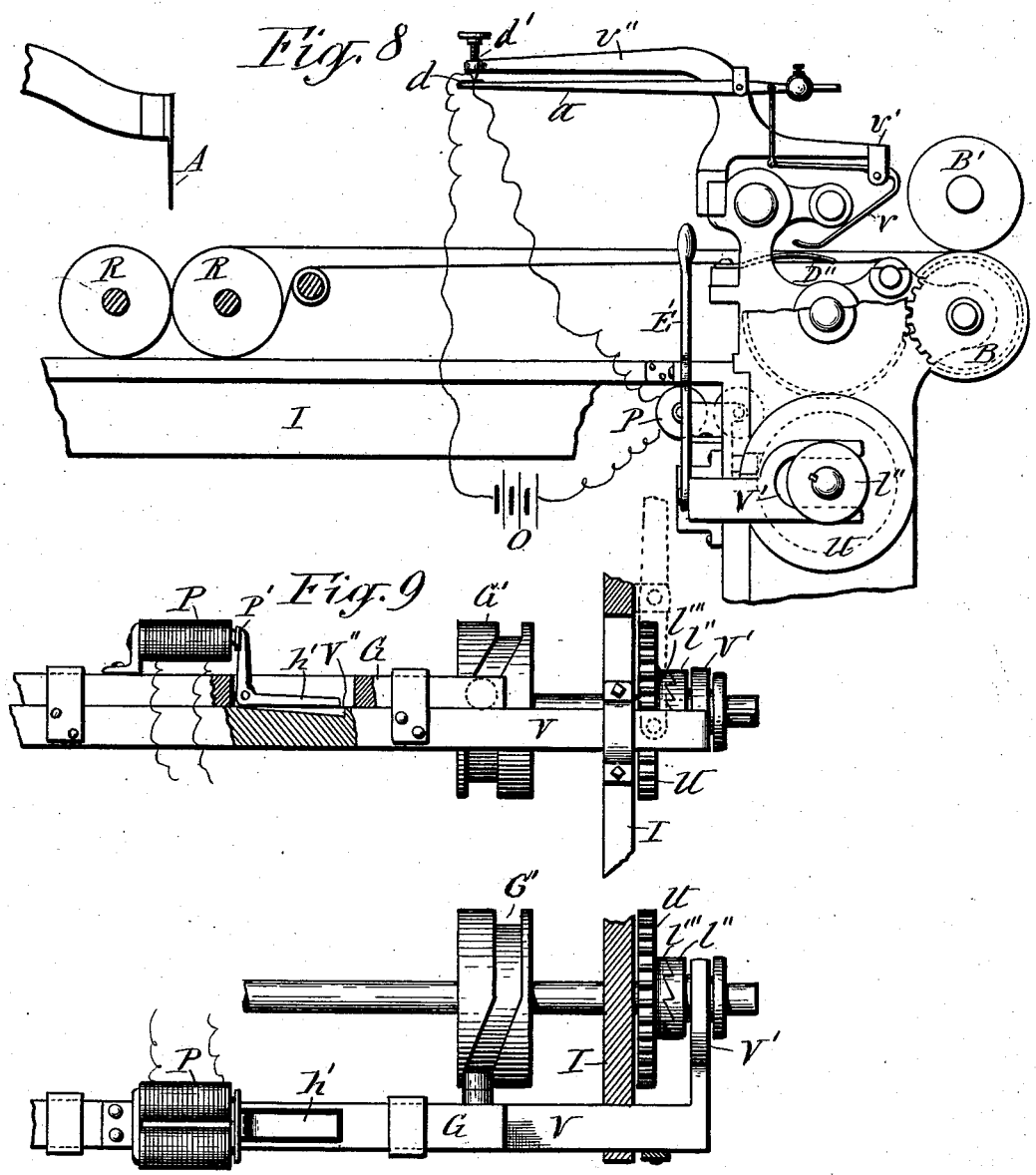

(No Model.) 8 Sheets—Sheet 5.
T. C. DEXTER.
AUTOMATIC STOP MOTION DEVICE.
No. 567,302. Patented Sept. 8, 1896.
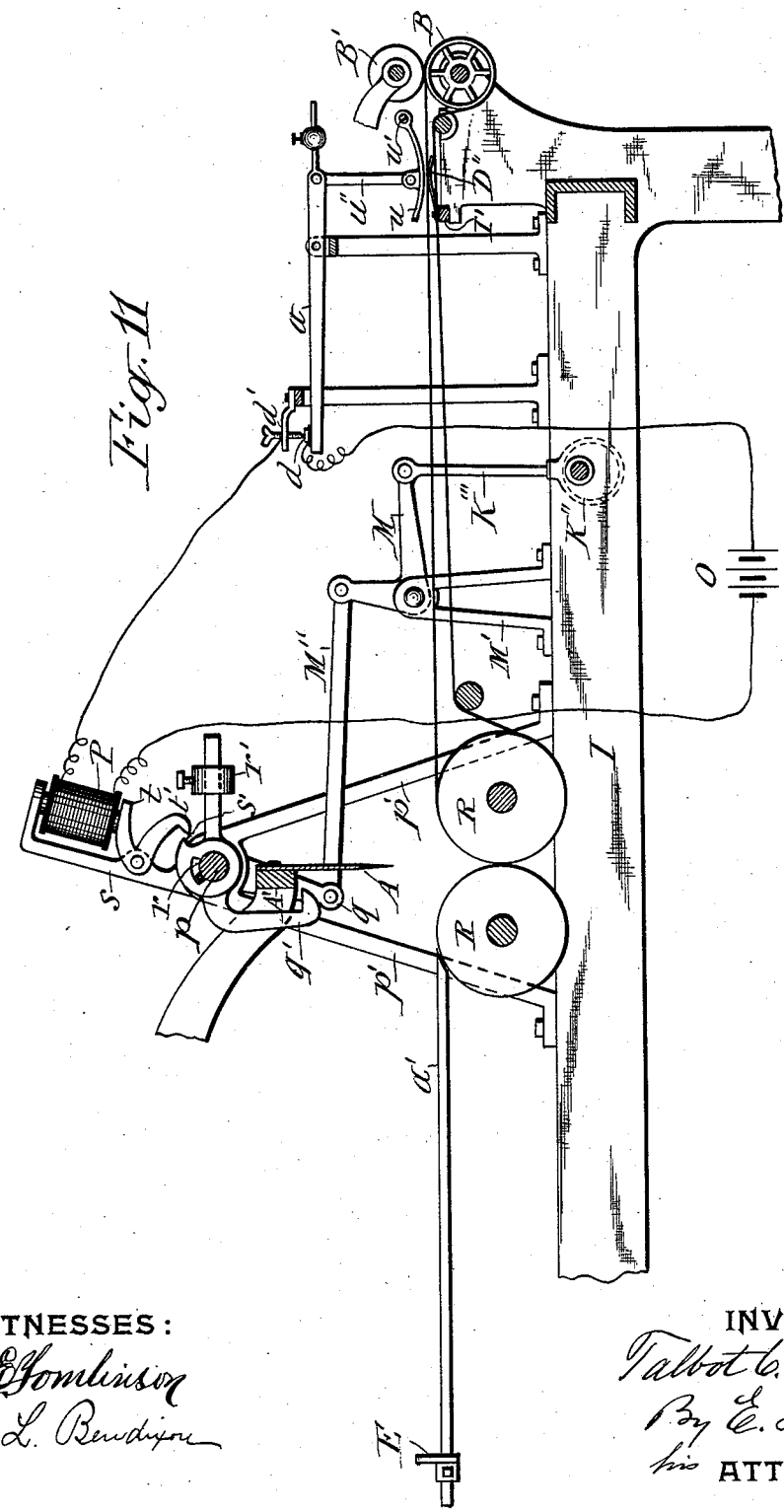
WITNESSES:
INVENTOR:
Talbot C. Dexter
By E. Laass
his ATTORNEY

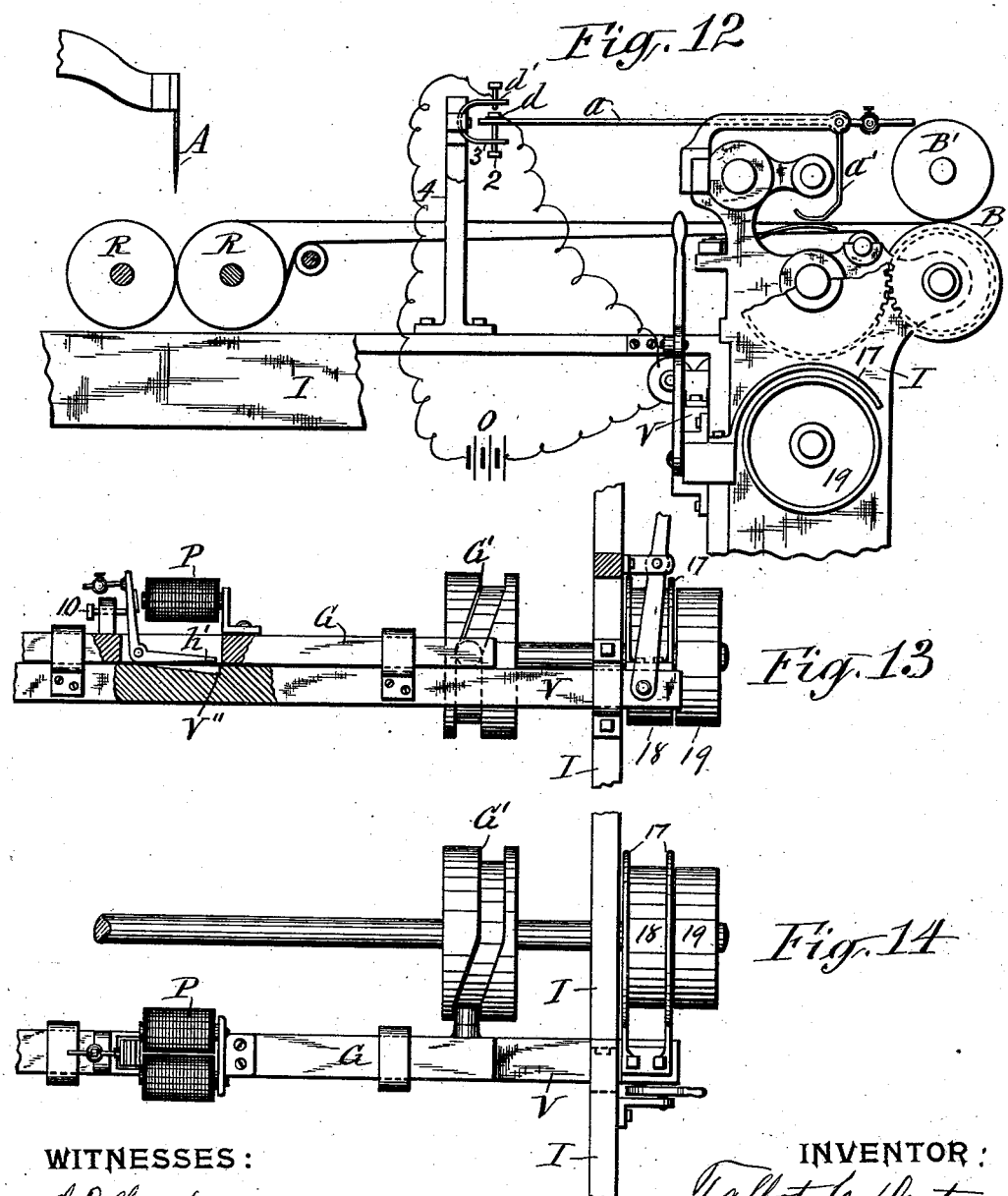

(No Model.) 8 Sheets—Sheet 7.

T. C. DEXTER.
AUTOMATIC STOP MOTION DEVICE.

No. 567,302. Patented Sept. 8, 1896.

WITNESSES:
INVENTOR:
Talbot C. Dexter
By E. Laass
his ATTORNEY (No Model.) 8 Sheets—Sheet 8.
T. C. DEXTER.
AUTOMATIC STOP MOTION DEVICE.
No. 567,302. Patented Sept. 8, 1896.
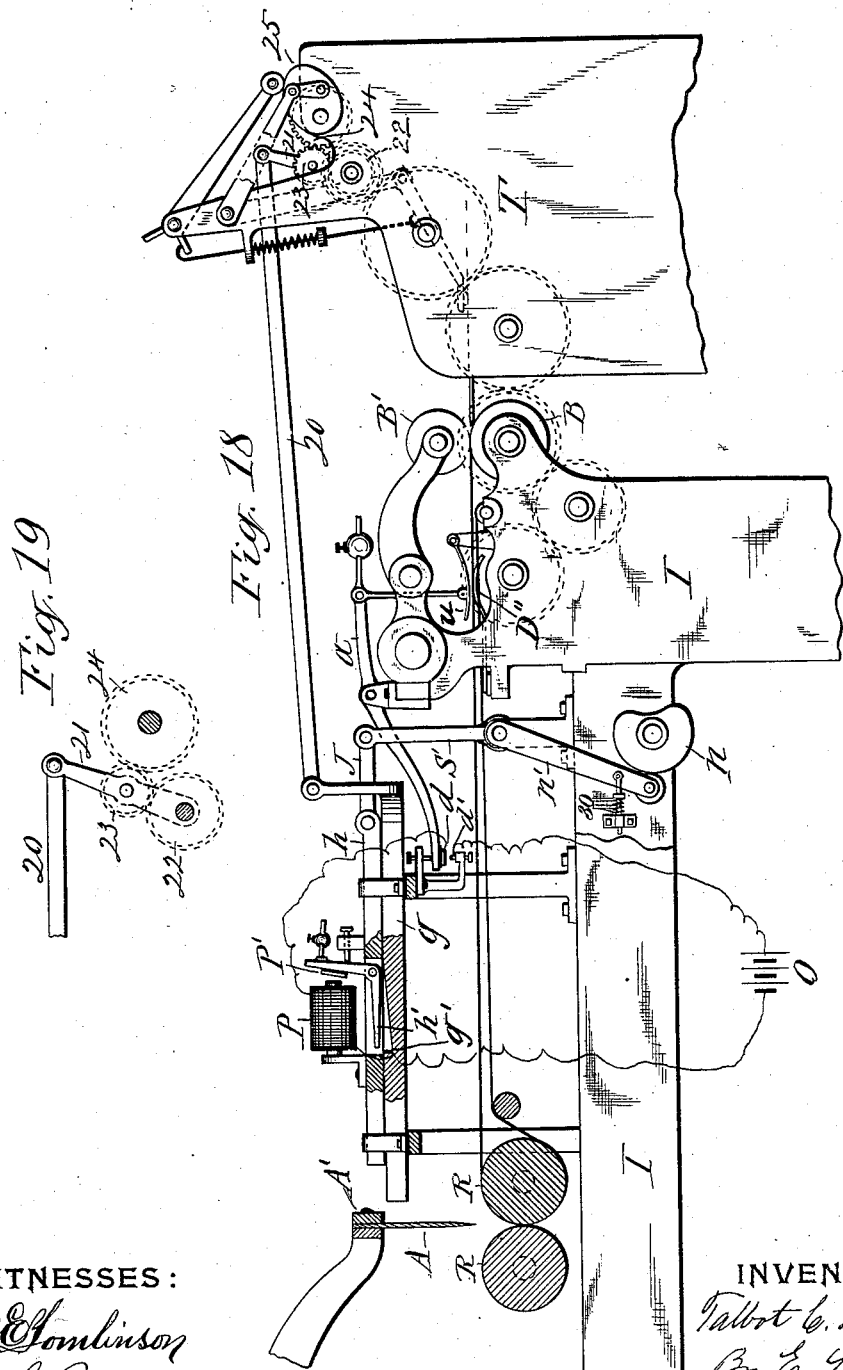
WITNESSES:
INVENTOR:
Talbot C. Dexter
By E. Laass
his ATTORNEY

UNITED STATES PATENT OFFICE.

TALBOT C. DEXTER, OF PEARL RIVER, NEW YORK.

AUTOMATIC STOP-MOTION DEVICE.

SPECIFICATION forming part of Letters Patent No. 567,302, dated September 8, 1896.

Application filed March 29, 1895. Serial No. 543,635. (No model.)

*To all whom it may concern:*

Be it known that I, TALBOT C. DEXTER, of Pearl River, in the county of Rockland, in the State of New York, have invented new and useful Improvements in Automatic Stop-Motions, of which the following, taken in connection with the accompanying drawings, is a full, clear, and exact description.

This invention relates to the class of automatic stop-motions which are employed on machines designed to operate on paper fed in single sheets thereto, and in which the action of the machine is to be arrested automatically at the instant two or more sheets are fed simultaneously to the machine.

My present invention is designed more particularly to be used in connection with paper-folding machines and feeding-machines supplying the paper to the folding-machines.

The object of the invention is to provide simple and efficient electrically-controlled mechanisms for arresting the operation of the machine in case two or more sheets are fed simultaneously thereto, and to effect this automatically by the paper in transit without subjecting the edges of the paper to forcible contact with positive stops in the path of the paper, which contact is liable to buckle the paper and injure the edges thereof; and to that end the invention consists essentially in the combination of calipers disposed in the path of the paper to said machine and operated by the thickness of the paper in transit through said calipers, mechanism for stopping the operation of said machine, an electromagnet controlling said mechanism, and a circuit maker and breaker in circuit with said magnet and actuated by the aforesaid calipers, whereby injury to the edge of the paper is obviated, all as hereinafter more fully described, and set forth in the claims.

Figure 2:
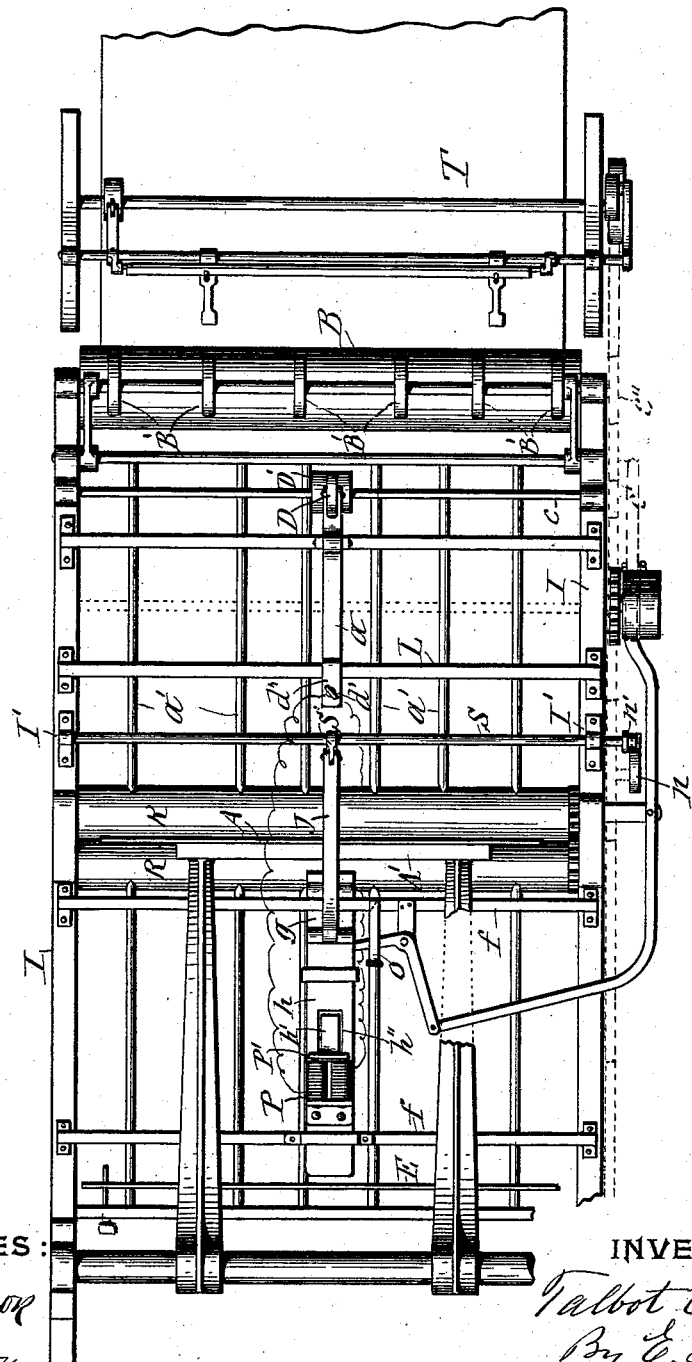
Figure 15:
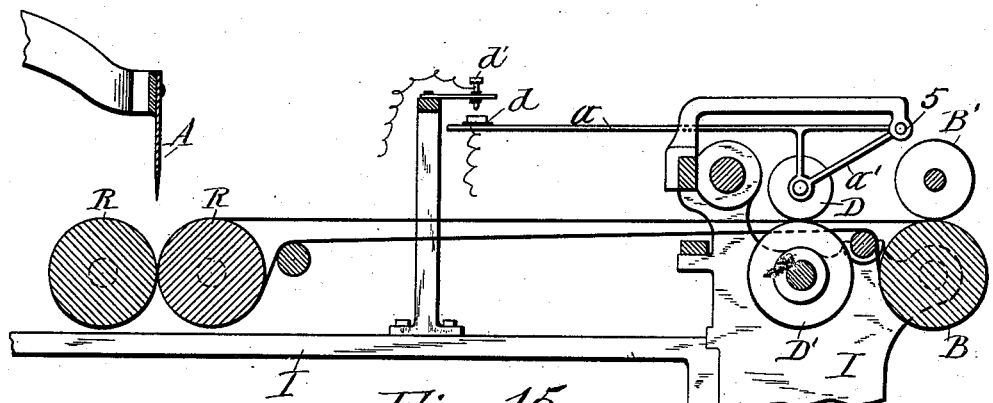
Figure 16:
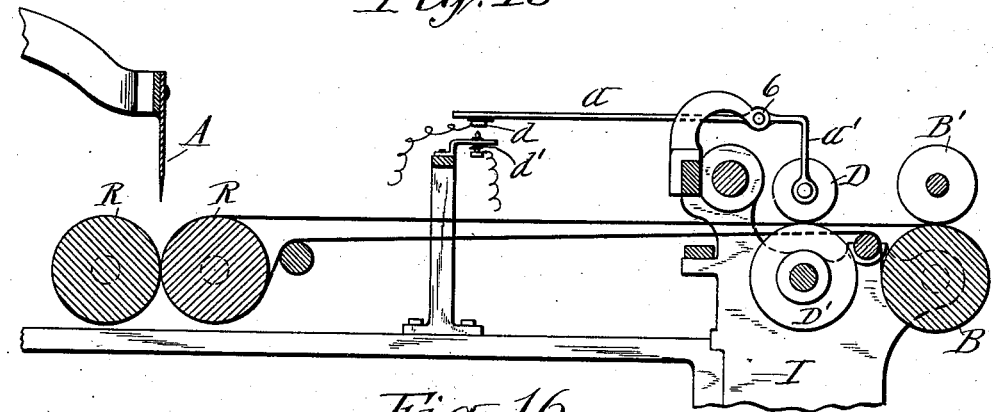
Figure 17:
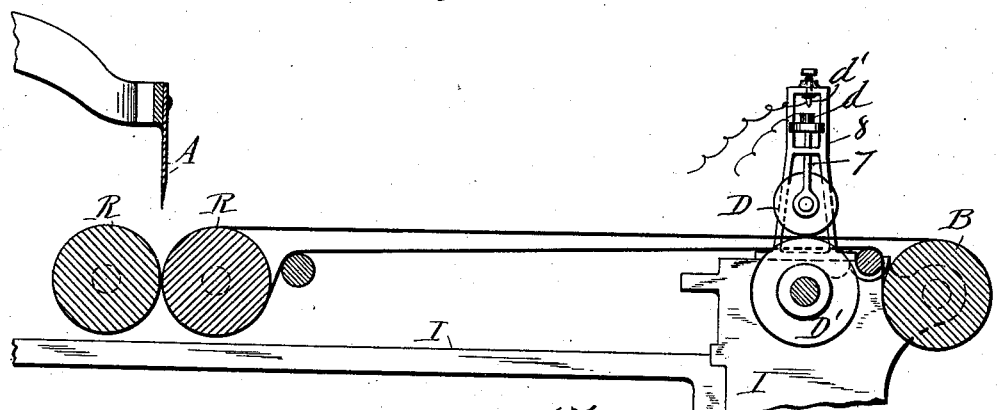

In the accompanying drawings, Figure 1 is a side elevation of a paper-folding machine in connection with a paper-feeding machine embodying my automatic stop-motion. Fig. 2 is a plan view of the same. Fig. 3 is an enlarged vertical longitudinal section of that part of the stop-motion which is connected to the paper-folding machine. Fig. 4 is a plan view of the same. Figs. 5 and 6 are enlarged side and plan views of the circuit-breaker. Fig. 7 is a detail view of the latch employed for locking the stop-motion after it has thrown the machine out of gear. Fig. 8 is a side elevation of a modification of the circuit-breaker and stop-motion. Figs. 9 and 10 are, respectively, side and plan views of said stop-motion. Fig. 11 is a vertical longitudinal section of a further modification of my invention. Fig. 12 is a side elevation of a further modification of my invention. Figs. 13 and 14 are, respectively, side and plan views of the stop-motion employed for shifting the driving-belt from the tight to the loose pulley. Figs. 15, 16, and 17 show still further modifications of the means for actuating the circuit maker and breaker. Fig. 18 is a side elevation, partly in section, showing the stop-motion arranged for throwing the feeding-machine out of gear; and Fig. 19 is a detail view of the means for effecting the latter.

Similar letters and figures of reference indicate corresponding parts.

I will first describe my invention as applied to paper-folding machines.

Referring to the annexed drawings, R R represent the first pair of folding-rollers, which impart the first fold to the sheet conveyed thereto by the usual traveling tapes and supported during said transit upon the longitudinal bars $a'$ $a'$. A denotes the blade which tucks the sheet into the bite of the aforesaid rollers in the usual manner. B is the feed-roller which carries the aforesaid tapes at the feeding end of the machine. B' are the drop-rollers which press the sheet down onto said feed-roller, and E is the gage which arrests the movement of the sheet after it has arrived at its requisite position over the folding-rollers R R for receiving the first fold therefrom. The paper to be folded is usually fed in single sheets or in sheets of only one thickness to the machine, and the folding-rollers and coöperating parts of the machine are arranged accordingly, hence it is essential to guard against the feeding of more than one sheet at a time to the machine. For this purpose I have devised my present invention of the automatic stop-motion, which is controlled by the thickness of the sheet in transit and prevents the operation of the machine upon the paper in case two or more sheets are fed simultaneously to the machine.

My said invention is susceptible of many modifications in the details of its component parts without departing from the spirit of my invention.

Among its essential features are suitable calipers disposed in the path of the paper, so as to be operated automatically by the thickness of the paper passing through said calipers. One of the members of the calipers consists of a suitable paper-supporter, which is confined directly under the plane in which the paper passes into the machine, and the other member of said calipers consists of a suitable mechanical feeler, which is over the aforesaid plane and movable vertically to and from said plane, so as to be actuated by the sheet passing under the feeler, the movement of which latter may be utilized in various ways to actuate the stop-motion, as hereinafter described. In Figs. 1 and 2 of the drawings said feeler is shown of the form of a roller D, which is preferably disposed at or near the center of the feeding end of the machine and pivoted to one end of an arm $a$, fulcrumed on a cross-bar $b$ secured to the frame I of the machine. Directly under the roller D is a paper-supporter, which in this case consists of a roller D', mounted on a shaft $c$, the end of which has fastened to it a gear $c'$, receiving motion from a gear $c''$ on the axis of the feed-roller B. Said gearing causes the paper-supporting roller D' to rotate in unison with the roller B. The aforesaid arm $a$ extends some distance from its fulcrum toward the folding-rollers R R, and is provided on its end with one of the terminals $d$ of the electric circuit derived from the battery O.

The coöperating terminal $d'$ I preferably form of a screw passing vertically through a bracket $d''$ fastened to a cross-bar L secured to the frame I. The movable and stationary terminals of the various circuit makers and breakers shown in the annexed drawings are invariably designated, respectively, by the reference-letters $d$ and $d'$. The said terminals are held normally in contact, and thus close the circuit, by the opposite end of the arm $a$ being depressed either by gravity or spring, so as to maintain the bottom of the roller D in the plane of the paper-conveying tapes of the machine. The screw $d'$ is so adjusted as to cause the terminal $d$ to be thrown out of contact with it by excessive tilting of the arm $a$, caused by the passage of more than one thickness of paper under the roller D. In order to maintain said terminals in contact during the passage of a single thickness of paper under the aforesaid roller and at the same time relieve said contact from undue pressure during the period in which no paper is fed to the machine, I form one of said terminals so as to permit it to slightly yield to the aforesaid pressure. This I preferably accomplish by forming the terminal $d$ of a copper plate or strip fastened at one end to the top of the arm $a$ and possessing sufficient elasticity to normally rise with its opposite end from the arm. This latter end of the copper strip has in it a hole through which passes the stem of a thumb-screw $e$ entering the arm $a$, as illustrated more clearly in Fig. 5 of the drawings. By means of said thumb-screw the copper strip $d$ can be sustained in such a position as to allow it to be depressed in case there is no paper passing under the roller D, and yet move sufficiently with the arm $a$ to break the contact of said plate with the screw $d'$.

P represents the electromagnet, which is connected with the battery O and with one of the aforesaid terminals of the circuit maker and breaker and is employed for controlling the stop-motion by which the machine is prevented from operating on the paper in case two or more sheets are simultaneously fed to the machine. Said stop-motion may be arranged in various ways, and I therefore do not wish to be limited specifically to the construction and combination of parts hereinafter described.

The following, however, is my preferred construction: On cross-bars $ff$, mounted on the frame I, is guided a longitudinally-movable bar $g$, the top of which is provided with a notch or shoulder $g'$. Upon this bar is mounted a longitudinal slide $h$, to which is secured the electromagnet P, the armature P' of which is pivoted to said slide and is formed with the pawl $h'$, beneath which an opening $h''$ is provided in the slide to allow said pawl to engage the notch or shoulder $g'$ of the subjacent bar, as more clearly shown in Figs. 3 and 4 of the drawings. The attraction of the armature to the magnet holds said pawl out of engagement. The slide $h$ receives a reciprocating motion from a rotary cam $n$, which imparts oscillatory motion to a lever $n'$ held in contact with said cam by a spring 30 (see Fig. 18) and attached to a rock-shaft S, which extends across the machine and is mounted in suitable bearings I' on the frame I.

At or near midway across the machine is an arm S' attached to said rock-shaft, and this arm is connected to the slide $h$ by a pitman J, which is curved over the top of the folding-blade A, so as to avoid interference with the operation of said blade.

In the operation of the machine the sheets of paper are designed to be fed singly between the feed-roller B and drop-roller B', from whence the sheet passes between the rollers D D' and thence to the gage E, as hereinbefore stated.

So long as the paper is fed in single sheets to the machine the sheet in transit between the rollers D D' does not lift the upper of said rollers sufficiently to throw the terminals $d\ d'$ out of contact, and thus the circuit remains closed, and the magnet P is caused to lift the pawl $h'$, so as to prevent it from engaging the notch $g'$ of the bar $g$ during the reciprocating motion of the slide $h$; but in case two or more sheets are fed simultaneously to the machine, the excessive thickness of the paper passing between the rollers D D' causes the upper of said rollers to be lifted so as to tilt the arm $a$ sufficiently to throw the terminal $d$ out of contact with the terminal $d'$, and thus break the electric circuit. This causes the magnet P to release its armature P', and thus the pawl $h'$ is caused to engage the notch or shoulder $g'$ of the bar $g$ during the movement of the slide $h$ toward the folding-blade A. The movement of said slide is so timed with that of the folding-blade A that the slide is caused to move toward said blade during the first part of the downward movement of the latter and push the end of the bar $g$ under the head A' of the descending blade, which is thereby prevented from descending sufficiently to come in contact with the paper lying across the folding-rollers R R. The bar $g$ is drawn back to its normal position by a spring K, which movement is limited by a shoulder K' on the bar coming in contact with the cross-bar $f$. In some cases I prefer to also utilize the motion of the bar $g$ for throwing the entire machine out of gear, and this can be accomplished by means of a lever $x$ pivoted to a bracket $x'$ on one of the cross-bars $f$, one arm of which lever is connected to the longitudinally-movable bar $g$, so as to be actuated thereby. The other arm of said lever is connected to the end of another lever $m$, which is pivoted at $m'$ to a suitable support on the side of the frame and is provided at the opposite end with the usual fork or loop $l$, through which the driving-belt passes, as illustrated in Figs. 1 and 2 of the drawings.

In case a paper-feeding machine is employed for supplying the paper to the folding-machine, said feeding-machine is usually geared to the folding-machine, as represented by dotted lines in Fig. 1, so as to cause them to operate in unison. Hence in throwing the folding-machine out of gear the operation of feeding the paper to said machine is simultaneously arrested.

T designates the feeding-machine, which may be of any suitable or well-known type.

When my automatic stop-motion is employed as last described, I provide a suitable latch $o$, pivoted or otherwise suitably connected to one of the cross-bars $f$, as more clearly shown in Fig. 7 of the drawings, to engage and lock the lever $x$ in its position after it has shifted the driving-belt as aforesaid. Said latch is thrown out of engagement when it is desired to set the machine in operation. I deem the aforesaid latch essential in most cases, as it prevents the machine from being immediately thrown in gear again by the force of the spring K drawing back the bar $g$.

When the folding-machine is equipped with a paper-feeding machine, it is very essential to stop the operation of said feeding-machine the instant it feeds more than one sheet at a time to the folding-machine, and therefore I may employ my automatic stop-motion for throwing the feeding-machine out of gear more direct and independent of the hereinbefore-described devices for arresting the movement of the folding-blade of the paper-folding machine. This more direct application of the stop-motion is illustrated in Figs. 8, 9, and 10 of the drawings, in which $l''$ represents the movable clutch member, which is forced to rotate with the shaft by a spline on the latter passing through a groove in the hub of said clutch member. The coöperating clutch member $l'''$ is fixed to the driving-gear U, which is mounted loosely on the shaft, and by means of a suitable train of gears transmits motion to the feed-roller B, as illustrated in Fig. 8 of the drawings. A bar V extends across the machine and slides in suitable guides on the frame I. One end of said bar terminates with a fork V', which straddles a circumferential groove in the clutch member $l''$. Upon the bar V is mounted the slide G, which receives reciprocating motion from a rotary cam G'. To said slide is secured the electromagnet P, whose armature P' is formed with the pawl $h'$, and is pivoted to said slide, and when released from the magnet causes the pawl to engage the shoulder V'' on the bar V during the reciprocating motion of the slide. Said engagement causes the bar to move with the slide, and thereby throws the aforesaid clutch members out of engagement. By means of a hand-lever E' pivoted to the frame I and connected to the aforesaid clutch the latter can be thrown back into engagement when it is desired to start the operation of the machine. The magnet P is connected by wires to the battery $o$ and to the terminal $d$, and another wire connects the terminal $d'$ to said battery, as shown in Fig. 8 of the drawings, which also shows a modification of the mechanism for operating the circuit maker and breaker, and consists of the plate D'', which is arranged directly under the path of the paper and a V-shaped finger $v$ pivoted at or near its angle to a bracket $v'$ and sustained with one end over the aforesaid plate D'' and connected at the opposite end to the arm $a$, which is pivoted to the bracket $v''$ and carries on its free end the terminal $d$. The other terminal or contact-screw $d'$ is connected to the free end of an arm $v''$ formed on the bracket $v'$, and by the adjustment of said screw the finger $v$ is held a proper distance from the paper-supporting plate D'' to allow only a single sheet to pass under said finger without breaking the circuit.

The means for arresting the operation of the folding-blade A upon the paper lying across the folding-rollers R R is also susceptible of modifications, one of which is illustrated in Fig. 11 of the drawings, in which $p$ represents a rock-shaft extending across the machine and mounted on suitable supports $p'$ $p'$, erected on the sides of the frame I. Said shaft receives motion from a rotary eccentric K'', which by a pitman K''' is connected to one of the arms of a bell-crank lever M, pivoted to a suitable support M' on the side of the frame I. The other arm of said lever is connected by a rod M″ to an arm q, fastened to the end of the rock-shaft p. At or near the center of the machine is a hook q′, hung on said rock-shaft, which hook is permitted to oscillate on the shaft so as to swing to and from under the head A′ of the folding-blade A. Said movement is limited by a lug on the shaft and playing in a groove r, extending part way around the interior of the hub of the hook. A weight r′ on an arm extending from said hub serves to hold the hook normally from under the head A′. At the side of the aforesaid hub is a bracket s, fastened to the rock-shaft. To this bracket is secured the magnet P, the armature t of which is pivoted to the bracket and is formed with a hook t′, adapted to engage a nose s′ on the hub of the hook q′. When the armature is attracted to the magnet, the hook t′ is lifted, so as to prevent it from engaging the nose s′ during the oscillations of the bracket s, but as soon as the said armature is released from the magnet the hook t′ of the armature drops into a position to engage the nose s′ during the oscillation of the bracket, and thereby swings the hook q′ so as to engage the head A′ of the folding-blade during the descent of the latter, which is thereby prevented from coming in contact with the paper lying across the folding-rollers. The hook q′, as well as the hereinbefore-described sliding bar g, may therefore properly be termed "detents" for arresting the movement of the folding-blade.

The action of the electro magnet is controlled by a circuit maker and breaker d d′, similar to that hereinbefore described. Fig. 11 also shows a slight modification of the means for operating the circuit maker and breaker, and consists in the employment of the finger u, pivoted at one end to a cross-rod u′, and sustained with its free end over a plate D″, secured to a cross-bar I′ mounted on the frame I. Said free end of the finger u is connected by a rod u″ to the front end of the pivoted arm a, to the opposite end of which is rigidly attached a copper plate which constitutes the terminal d. By adjustment of the contact-screw d′ bearing on the said terminal the arm a can be made to sustain the free end of the finger u from the underlying plate D″ a distance exactly equal to the thickness of a single sheet of paper to be fed to the folding-machine, so in case two sheets pass simultaneously between said finger and plate the finger is lifted sufficiently to tilt the arm a, and thereby break the electric circuit.

I do not limit myself to the employment of a normally closed electric circuit for controlling the stop-motion, inasmuch as by a modification of mechanism for transmitting motion to the circuit maker and breaker I am enabled to attain the desired result by a normally open circuit, as illustrated in Figs. 12, 15, 16, and 17 of the drawings. In Fig. 12 the arm a is either formed integral with or rigidly attached to the finger a′ and secured at their junction to a transverse shaft pivoted to suitable supports on the sides of the frame I. The free end of the arm which carries the terminal d rests normally upon the end of a screw 2, which is supported under the arm by a yoke 3 attached to a cross-bar mounted on props 4 secured to the sides of the frame I. By the adjustment of said screw the arm can be raised or lowered to support the free end of the finger at the requisite distance above the plate D″ to allow only a single thickness of paper to pass between said finger and plate without disturbing the said arm. The aforesaid yoke has one of its prongs extending over the arm a and provided with the contact-screw d′, which is adjusted to stand normally out of contact with the terminal d on the aforesaid arm when the latter is at rest or at its normal position.

In Fig. 15 the arm a is pivoted at its front end to its support, as shown at 5, and provided with a depending supplemental arm a′, to the lower end of which is pivoted the roller D, and thereby supports the free end of the arm a, over which latter is the contact-screw d′, arranged to be normally out of contact with the terminal d on top of the arm a.

In Fig. 16 the arm a is pivoted intermediate its length, as shown at 6, and is provided with the pendent supplementary arm a′ on the front end. The roller D, pivoted to the lower end of the supplementary arm a′ and riding on the roller D′, supports the free end of the arm a. In this case the terminal d is on the under side of the free end of the arm and the contact-screw d′ is beneath said terminal and adjusted to come in contact when the arm a is actuated by two or more sheets of paper passing simultaneously under the roller D. In Fig. 17 the vertically-yielding roller D is pivoted to a stem 7, which slides in a vertical guide 8, and has attached to it the terminal d, over which is the contact-screw d′, adjustably connected to the top of the guide 8 and normally out of contact with the terminal d.

Either of the described circuit makers and breakers can be used in connection with either of the hereinbefore-described stop-motions. An exemplification of such a connection is illustrated in Figs. 12, 13, and 14 of the drawings, which is substantially the same as those shown in Figs. 8, 9, and 10 of the drawings, with the exception of the devices for throwing the machine out of gear, which in this last case is represented of the form of the usual fork or loop 17, attached to the bar V and receiving through it the driving-belt of the machine. The longitudinal movement of the bar V shifts the driving-belt from the tight pulley 18 to the loose pulley 19. The reciprocating slide G, which receives motion from the rotary cam G′, has connected to it the pawl h′, adapted to engage and release a shoulder V″ on the bar V, and is normally held out of engagement either by gravity, as shown, or by a spring, and is sustained in said normal position by a set-screw 10, attached to a post on the slide and bearing on the back of the upward extension of the pawl, which extension has affixed to it the armature of the magnet P. When the circuit is closed by either of the circuit makers and breakers shown in Figs. 12, 15, 16, and 17 of the drawings, the aforesaid magnet is energized, and by attracting the armature it causes the pawl $h'$ to engage the shoulder $V''$ during the movement of the slide G in one direction. The bar V is thus compelled to move with the slide, and in this movement it shifts the belt from the tight onto the loose pulley.

In summing up the described invention the roller D, as well as the various fingers used in lieu of said roller, may be termed "mechanical feelers," which, by feeling of the thickness of the paper in transit and yielding vertically to variations of said thickness, control the stop mechanism through the medium of electrically-operated auxiliary devices.

To throw the feeding-machine more directly and positively out of gear in case two or more sheets are fed to the folding-machine, the bar $g$ may be arranged between the folder-blade A and feeding-machine, as shown in Fig. 18 of the drawings, and connected by a rod 20 to the arm 21, which is pivoted to the axis of a gear 22 of the feeding-machine and carries the pinion 23, by which motion is transmitted from said gear to the gear 24, attached to the shaft of the cam 25, which actuates the feeding mechanism.

What I claim as my invention is—

1. In combination with the stop mechanism, a vertically-yielding feeler in the plane of the sheet-conveyers and actuated by varying thickness of paper in transit, an arm pivoted intermediate its length and connected at one end to the aforesaid feeler, an electric terminal attached to the opposite end of said arm, a coöperating terminal facing the terminal on the arm, an electromagnet in circuit with said terminals and controlling the stop mechanism as set forth.

2. The combination, with a paper-folding machine, of a detent arresting the movement of the folding-blade and normally in position to release the same, an electromagnet controlling said detent, a feeler actuated by the thickness of the paper in transit, and a circuit maker and breaker in circuit with said magnet and actuated by the said feeler as set forth.

3. The combination, with a paper-folding machine, of a detent arresting the movement of the folding-blade and normally in position to release the same, a detent-actuator, a pawl connected to said actuator and automatically engaging the detent, an electromagnet releasing the detent from the pawl, a feeler actuated by the thickness of the paper in transit to the folding-rollers, and an electric circuit maker and breaker in circuit with said magnet and actuated by said feeler as set forth.

4. The combination, with a paper-folding machine, of a bar movable to and from under the head of the folding-blade, a spring drawing said bar from said head, a reciprocating slide riding on said bar, an electromagnet mounted on said slide, the armature pivoted to the slide and formed with a pawl engaging a shoulder on the aforesaid bar, a feeler actuated by the thickness of the paper in transit to the folding-rollers, and a circuit maker and breaker in circuit with the aforesaid magnet and actuated by the feeler as set forth.

5. In combination with a lever for throwing the machine in and out of gear, a longitudinally-movable bar connected to the aforesaid lever, a reciprocating slide riding on said bar, an electromagnet mounted on the slide, the armature pivoted to the slide and formed with a pawl engaging the aforesaid bar, a feeler actuated by the thickness of the paper in process of being fed to the machine, and a circuit maker and breaker in circuit with the aforesaid magnet and actuated by the feeler as set forth.

6. In combination with the folding-blade and driving-pulley, a bar movable to arrest the descent of the folding-blade and normally in position to release the same, a lever connected to said bar, a belt-shipper connected to said lever, a slide riding on said bar, a rotary cam, a bar transmitting motion from said cam to said slide, an electromagnet mounted on the slide, the armature pivoted to the slide and formed with a pawl engaging the subjacent bar, a feeler actuated by the thickness of the paper in transit to the folding-rollers, and a circuit maker and breaker in circuit with the aforesaid magnet and actuated by the feeler all combined to operate substantially as described and shown.

7. In combination with a paper-folding machine and a feeding-machine delivering the paper to said folding-machine, a paper-supporter confined under the path of the paper between said machines, a vertically-yielding feeler over said supporter to be actuated by the paper in transit, an electric circuit, a circuit maker and breaker actuated by the feeler, a bar movable to arrest the descent of the folding-blade and normally in a position to release the same, mechanism for throwing the feeding-machine in and out of gear and actuated by the aforesaid bar, a slide riding on said bar, a rotary cam, a lever transmitting motion from said cam to the slide, an electromagnet in the aforesaid circuit and a catch locking and unlocking the slide to and from the aforesaid movable bar and actuated by the armature of the aforesaid magnet as set forth.

In testimony whereof I have hereunto signed my name this 4th day of March, 1895.

TALBOT C. DEXTER. [L. S.]

Witnesses:
JAS. A. WHITLOCK,
DE WITT C. WELD, Jr.